(12) United States Patent
Cuomo et al.

(10) Patent No.: US 6,836,878 B1
(45) Date of Patent: *Dec. 28, 2004

(54) VISUAL PROGRAMMING FROM A TREE STRUCTURE

(75) Inventors: Gennaro A. Cuomo, Apex, NC (US); Binh Q. Nguyen, Cary, NC (US); Richard J. Redpath, Cary, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 841 days.

(21) Appl. No.: 08/657,510

(22) Filed: Jun. 4, 1996

(51) Int. Cl.[7] .................................................. G06F 9/44

(52) U.S. Cl. ........................................................ 717/100

(58) Field of Search ................................ 395/701, 702, 395/500, 703; 345/967; 717/1, 2, 3

(56) References Cited

U.S. PATENT DOCUMENTS

| | | | | |
|---|---|---|---|---|
| 5,119,475 A | * | 6/1992 | Smith et al. | 395/156 |
| 5,187,788 A | * | 2/1993 | Marmelstein | 395/700 |
| 5,553,282 A | * | 9/1996 | Parrish et al. | 395/600 |
| 5,615,346 A | * | 3/1997 | Gerken | |
| 5,630,131 A | * | 5/1997 | Palevich et al. | 395/701 |
| 5,642,511 A | * | 6/1997 | Chow et al. | 395/701 |
| 5,651,108 A | * | 7/1997 | Cain et al. | |
| 5,715,432 A | * | 2/1998 | Xu et al. | 395/500 |

OTHER PUBLICATIONS

"Borland Delphi for Windows; User's Guide", Borland International, 1995 p. 8–42.*

Article "Borland Shows Delphi", Borland International, Feb. 27, 1995.*

"Borland C++3.0; User's Guide", Borland International, 1991, 1992, p. 79–91.*

"Smalltalk–80; The Language", Adele Goldberg and David Robson, ParcPlace Systems, Sep. 1989, p. 297–307.*

(List continued on next page.)

*Primary Examiner*—Sue Lao
(74) *Attorney, Agent, or Firm*—Gregory M. Doudnikoff

(57) ABSTRACT

A technique for permitting a developer to be presented with a visual programming environment which includes different representations of a class library from which a developer may select classes for inclusion in an application under development. The environment includes a class window, a composition editor window, and a methods window. To permit greater understanding of the class library that the developer is working with, the class library can be presented in the class window in a class tree format, in a class list format, or in a graphical format which includes graphical representations of the classes. The developer may select a class for inclusion in the application under development from any of the three formats. The methods window is provided for displaying the methods (code) for a selected class. The methods of a class may be modified or new methods added via the methods window after the class has been added to the application under development. The composition editor window provides a graphical view of, for example, a graphical interface under development for the application, and dynamically displays to the developer at least the graphical portion of the application as it is being developed. Descriptions of added classes which do not have the visual representations may also be included in the composition editor window as they are added to the application.

13 Claims, 11 Drawing Sheets

OTHER PUBLICATIONS

Adele Goldberg and David Robson, "Smalltalk–80; The Language", Parcplace Systems, p. 291–314, Sep. 1989.*

I. Rodens, "Examining Symantec C++ 7.0", Dr. Dobb's Journal, pp. (5), Aug. 1995.*

"Example–then–Domain Approach in an Object–Oriented Application Builer", IBM TDB, vol. 37, No. 02B. pp. 135, Feb. 1994.*

* cited by examiner

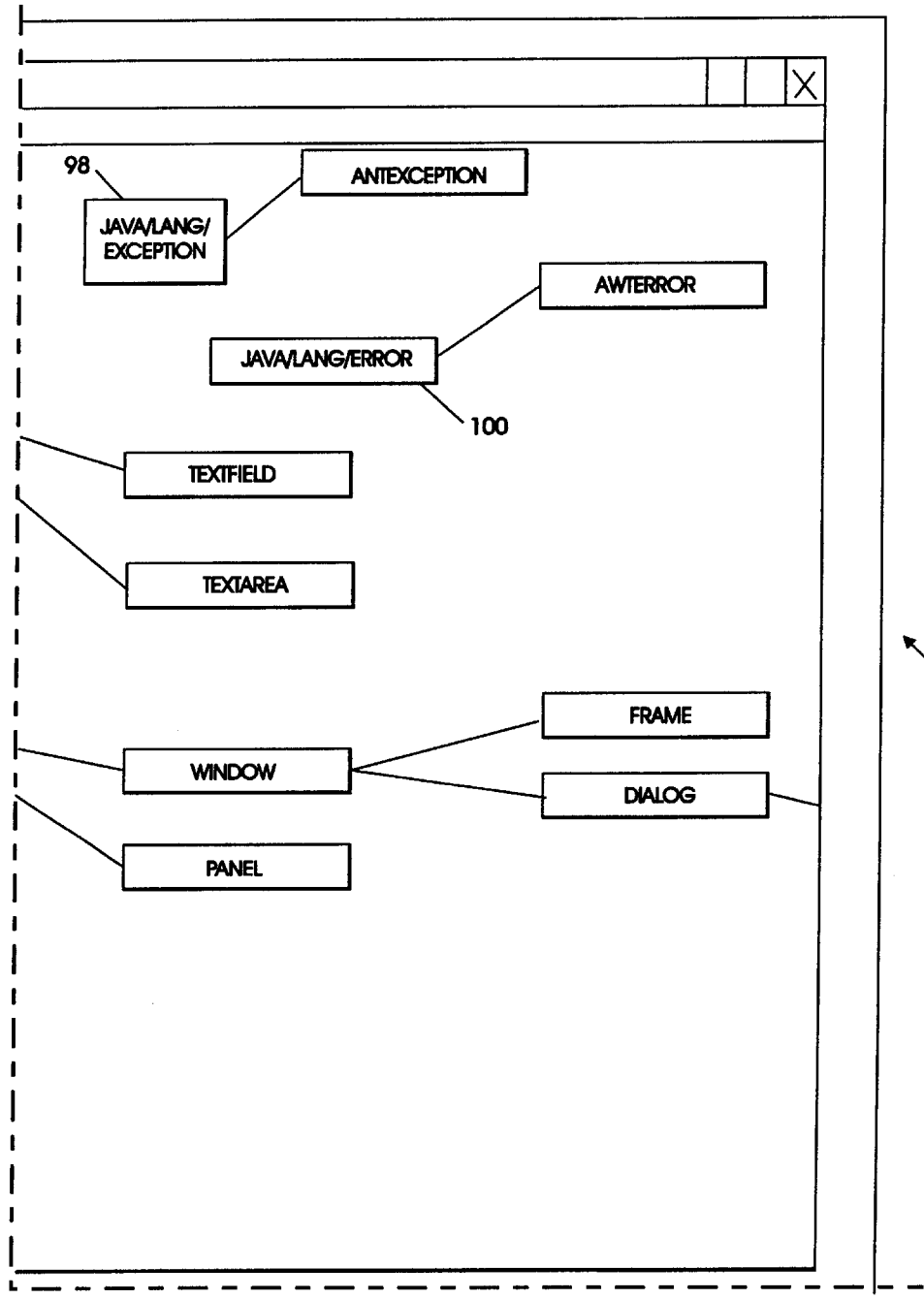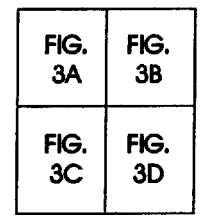

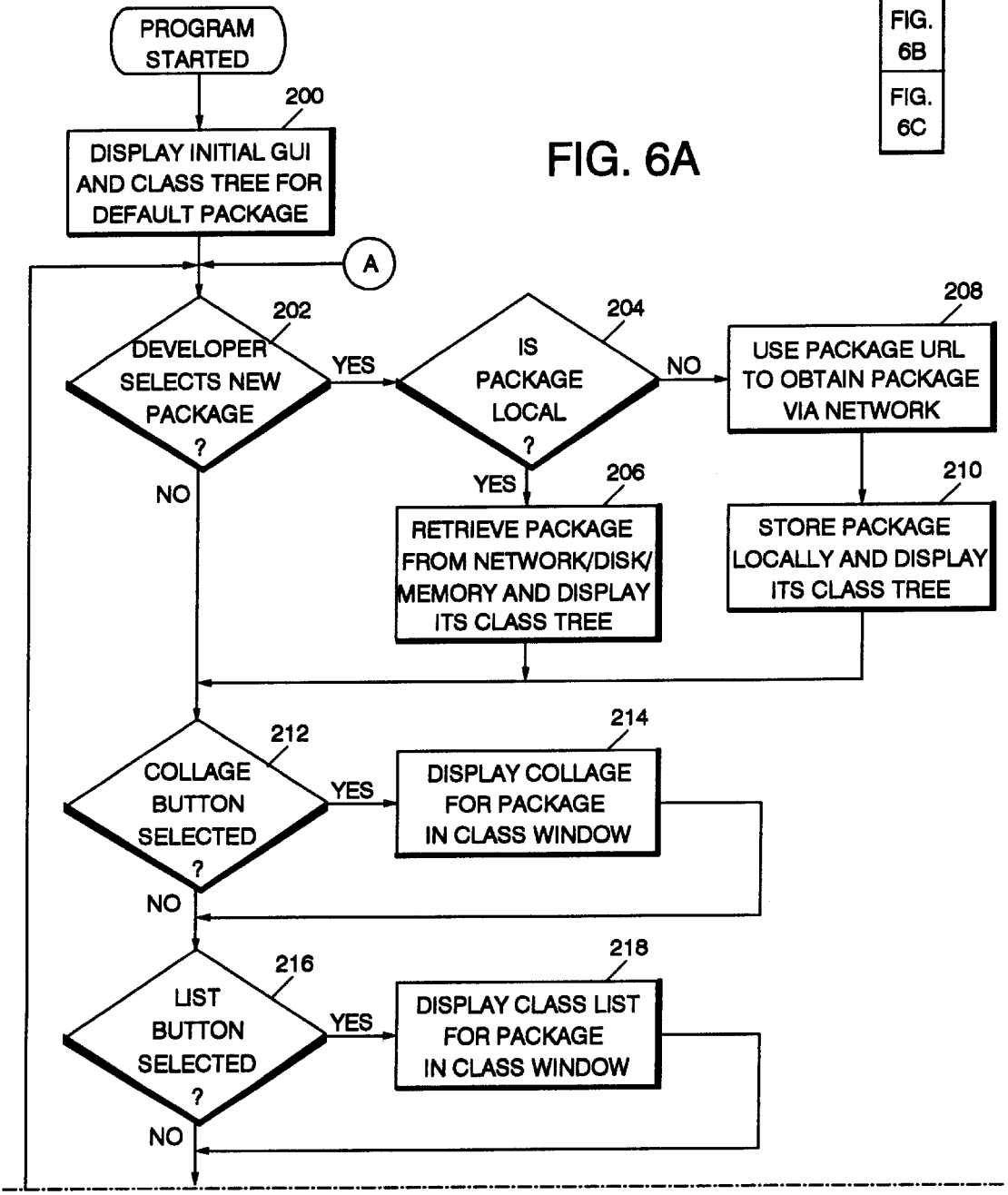

VISUAL PROGRAMMING FROM A TREE STRUCTURE

BACKGROUND OF THE INVENTION

1. Field of the Invention

The present invention relates to a technique for enabling a user of a data processing system to intuitively navigate through hierarchical data and manipulate the data for use in a desired manner. More particularly, the present invention relates to a technique for permitting a user of a data processing system to manipulate data presented in a tree structure to develop software applications.

2. Description of the Related Art

One of the major drawbacks for computer software users and developers has been the difficulty of use associated with the software. An industry wide effort has been underway for several years to create graphical user interfaces (GUIs) for computer software that are intuitive and user friendly. Folders, icons, buttons, scroll bars, etc. are examples of GUI improvements which have been introduced which may using computer software easier and more intuitive for both novices and experts.

One area that has been of particular concern is the use and manipulation of data or information which is hierarchical; that is, data or information that has hierarchical relationships, such as object oriented class libraries. Typically, a user must know or understand the relationship of components within the hierarchy of the information as well as the content of specific components within the hierarchy. While it is a relatively easy manner to present one or the other of these concepts to a user in a graphical user interface environment, such as through a tree structure for hierarchical data or by presenting the methods for a class within a given hierarchy, presenting both to a user simultaneously in an intuitive manner has proven difficult. A number of browsers have been devised which attempt to show both of these concepts simultaneous by using multiple parallel columns, with information in the leftmost column being the highest in the hierarchy of the information presented, with the hierarchy level of the information descending one level with each column to the right. Thus, for example, a class list, a subclass list (for a selected class), and the code for a method (for a selected subclass) may be shown in three adjacent columns, from left to right, respectively. A small graphical indicator is also employed to show the relative hierarchical position of the information in the three columns within a larger hierarchy. For example, see U.S. patent application Ser. No. 08/370,773, now U.S. Pat. No. 5,615,346 which is assigned to the same assignee. However, such browsers are best suited for expert users who know and/or must memorize large amounts of information regarding the hierarchical data and overall hierarchy. Further, such browsers do little to ease the learning burden for users at a novice or intermediate programming level.

A technique that has been developed to assist novice and intermediate programmers utilizing application development tools, such as VisualAge for Smalltalk from International Business Machines Corporation (IBM) and Power-Builder from Sybase Inc, has been the concept of visual programming and programming from parts. In addition to the underlying programming language, such application development tools provide a selection of pre-built software parts or components presented to a software developer via an icon in a graphical user interface together with a open work space. By simply selecting one of the icons and dragging it into the work space, the developer in effect programs an application that the developer is creating to include the code for the function of the part or component which the icon represents.

Programming from parts is especially effective for developing graphical user interfaces for software applications being created, but is employed for adding many types of function to applications, such as communication, database access, multimedia, etc. However, the degree of difficulty quickly rises if the need arises to modify or extend the underlying programming for the parts or components. If the software developer needs to change or modify or extend the function of the part for customization purposes, the developer must go behind the iconic representation to the actual code. Often the part will be hierarchical in nature, as is the case for tools such as VisualAge which build applications in object oriented languages, such as Smalltalk or Java. Modification or customization of or extending VisualAge parts or components is possible. Typically, a part or component is written to conform with a "parts" architecture, and options may be built into a part such that while the part is provided with default settings, a developer may specify or customize the part through modifications of specific attributes or settings through a series of list boxes. However, if a desired choice is not provided, methods of the Smalltalk code must be modified or newly written and added to the instance of the part that has been added to the application. If the developer is never presented with the actual hierarchy of the part, which is typically a set of hierarchical classes, and a way to quickly understand the hierarchy and related data, modification or customization or extension of the part or component can be very difficult.

To date, no complete solution has been provided to these problems associated with hierarchical data. These problems have been addressed individually at times, but no overall solution has been provided. Accordingly, need exists for a technique for permitting the relationships of components within a hierarchy of data to be easily understood and for permitting a user to manipulate that data intuitively.

SUMMARY OF THE INVENTION

An object of the present invention is to provide visual programming capabilities for hierarchical information presented in a tree structure.

Another object of the invention is to provide an intuitive graphical user interface for software development tools.

Yet another object of the invention is to provide a technique for permitting users to manipulate hierarchical data presented in a tree structure.

A further object of the invention is to provide an enhanced interface and tool for visual programming.

Other objects and advantages of the present invention will be set forth in part in the description and the drawings which follow and, in part, will be obvious from the description or may be learned by practice of the invention.

To achieve the foregoing objects, and in accordance with the purpose of the invention as broadly described herein, the present invention provides computer readable code on media for use in a computing environment for permitting development of an application from a plurality of available classes, comprising first subprocesses for displaying a hierarchy of selectable classes in a class tree; second subprocesses for simultaneously displaying a graphical representation of the application under development; and third subprocesses for simultaneously displaying code for one of the selectable classes. The computer readable code may further comprise fourth subprocesses for displaying the selectable classes in a class list, and fifth subprocesses for displaying the selectable classes as selectable graphical representations, wherein selection of one of the graphical representations selects its corresponding selectable class. Additionally, the computer readable code may further comprise sixth subprocesses for displaying one of the class tree and the class list at a time in a class window. Alternatively, the class tree is displayed in a class window, the graphical representation of the application under development is displayed in a composition editor window, and the code is displayed in a code window, and the class window, the composition editor window and the code window are displayed simultaneously. The code may further comprise seventh subprocesses for permitting a user to select for display in the class window from among the class tree, a class list of the selectable classes, and selectable graphical illustrations of the selectable classes.

Additionally, the present invention provides in an application development tool in a computing environment, a method for presenting class packages to a developer having classes for selection by the developer and inclusion in an application being created, comprising displaying a class package in a first window; displaying a graphical representation of the application being created in a second window; and displaying code for a class from the displayed class package in a third window. Preferably, the first, second and third windows are displayed simultaneously, classes from the displayed class package are selectable for inclusion in the application being created, and the classes in the displayed class package are displayed hierarchially in a class tree. The method may further comprise the step of permitting a user to select which class package is to be displayed in the first window from a plurality of class packages, and the step of permitting a user to select to have classes comprising the class package displayed hierarchically in class tree format or in a collage of graphical representations of the classes. The permitting step may also permit the user to select to have the classes comprising the class package to be displayed in a class list. Preferably, the displaying code step further comprises, upon a user selecting a class, displaying the code for the selected class in the third window. Further, a user may preferably modify the code for the class in the third window.

In a data processing system, the present invention provides a system for permitting a user to include selectable classes from available class packages in an application being created, comprising first means for displaying classes from a first class package; second means for displaying code for one of the classes, wherein the first and second means display the selectable classes and the code simultaneously; third means for permitting the user to select a different class package from among the available class packages for display of its classes by said first means; and fourth means for retrieving the selected class package over a network if the selected class package is not stored locally.

The system may further comprise fifth means for simultaneously displaying with the first and second means a graphical representation of at least a part of the application being created. Preferably, the first means displays the classes in a first window and the second means displays the code in a second window. The first means may further permit the user to select a format from a plurality of available formats in which to display the classes, and the available formats may include a class tree and a collage.

The present invention will now be described with reference to the following drawings, in which like reference numbers denote the same element throughout.

BRIEF DESCRIPTIONS OF THE DRAWINGS

FIGS. 6A–6C illustrates a flowchart which sets forth the logic involved with programming an application via the interface of FIGS. 3–5 in accordance with the present invention.

DESCRIPTION OF THE PREFERRED EMBODIMENT

The present invention may be performed in any of a variety of known computing environments.

Figure 1:
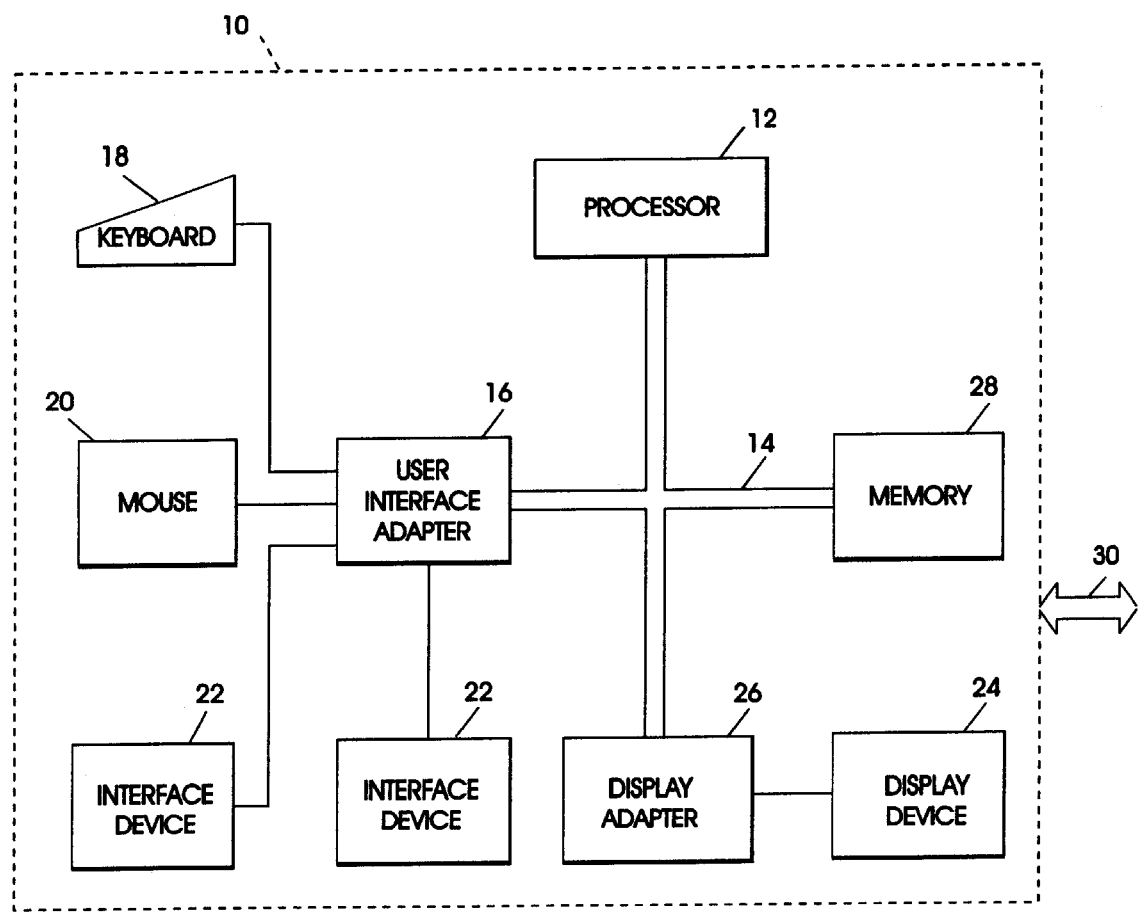
FIG. 1 is a block diagram of a computer workstation environment in which the present invention may be practiced.

FIG. 1 illustrates a representative workstation hardware environment in which the present invention may be practiced. The environment of FIG. 1 comprises a representative conventional single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized pen entry pad, etc. The bus 14 also connects a display device 24, such as an LCD screen or monitor, to the microprocessor 12 via a display adapter 26. The bus 14 also connects the microprocessor 12 to memory 28, which can include ROM, RAM, etc.

The workstation 10 communicates via a communications channel 30 with other computers or networks of computers. The workstation 10 may be associated with such other computers in a local area network (LAN) or a wide area network, or it can be a client in a client/server arrangement with another computer, etc. All of these configurations, as well as the appropriate communications hardware and software, are known in the art.

Figure 2:
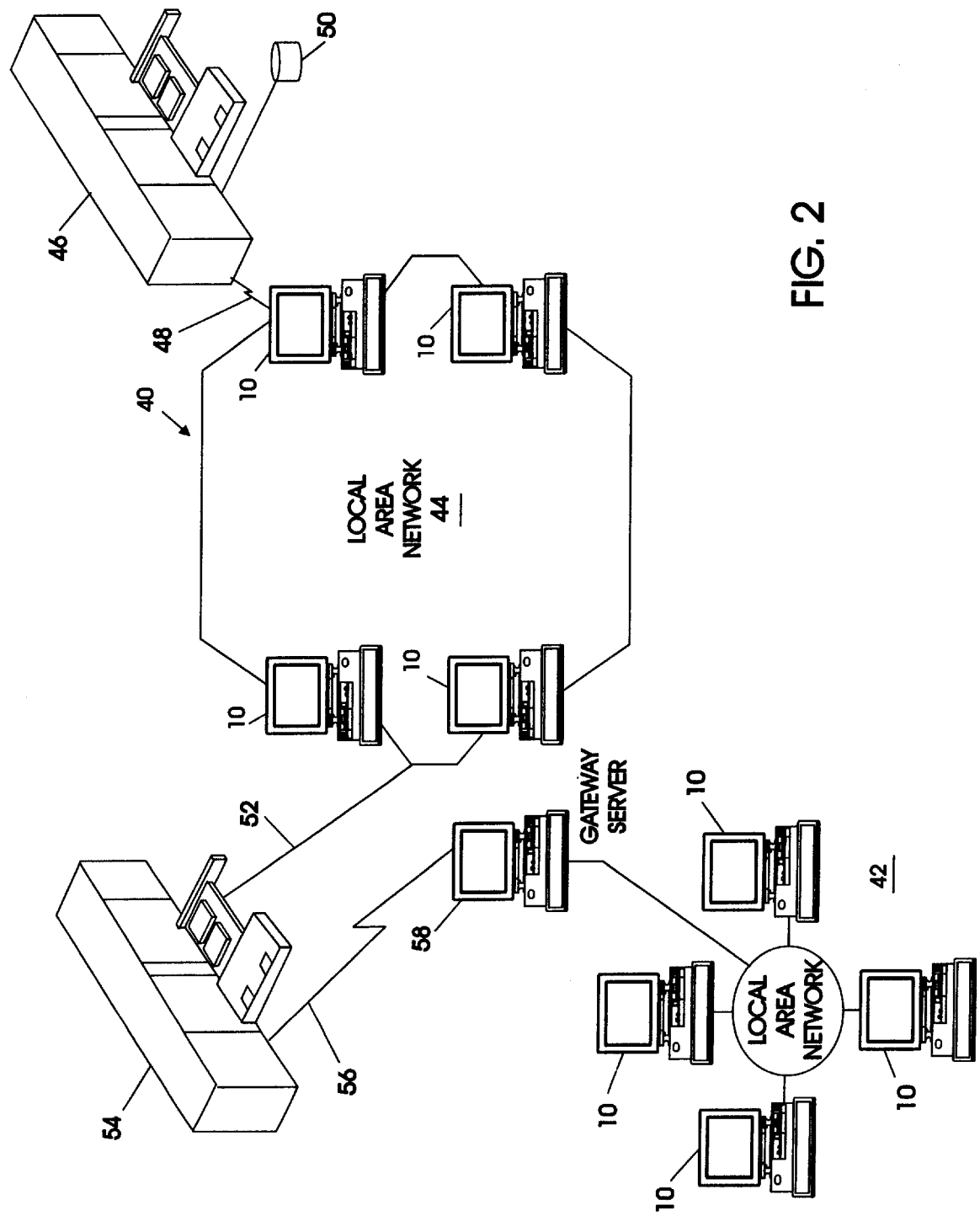
FIG. 2 is a diagram of a networked computing environment in which the present invention may be practiced.

FIG. 2 illustrates a data processing network 40 in which the present invention may be practiced. The data processing network 40 includes a plurality of individual networks, including LANS 42, 44, each of which presently includes a plurality of individual workstations 10. Alternatively, those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise System Architecture/370 or an Enterprise Systems Architecture/390 computer available from IBM. Depending on the application, a mid-range computer, such as an Application System/400 (also known as an AS/400)

may be employed. "Enterprise Systems Architecture/370", "ESA/370", "Enterprise Systems Architecture/390", and "ESA/390" are trademarks of IBM; "Applications Systems/400"; and "AS/400" are registered trademarks of IBM.

The mainframe computer 46 may also be coupled to a storage device 50, which may serve as remote storage for the LAN 44. Similarly, the LAN 44 may be coupled via a communications link 52 through a sub-system control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in the memory 28 of the workstation 10. In a client/server environment, such software programming code may be stored with memory associated with a server. The software programming code may be embodied on any of a variety of known media for use with a data processing system, such as a diskette or CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

The preferred embodiment of the present invention will now be described with reference to FIGS. 3 and 4.

In the preferred embodiment, the present invention is implemented in the Java object oriented language. Java is a trademark of Sun Microsystems, Inc. Application development tools for object oriented development languages, such as Java, Smalltalk, and C++, typically include class libraries or parts or components for use by developers when programming with the development tool. Class libraries are reusable sets of code which usually provides a relatively high level function which a developer may add to a software application being created. Class libraries are hierarchical in nature, in that a parent or superclass includes characteristics which are inherited by subclasses of the parent class. The subclasses may have further subclasses. These relationships are easily viewed in a class tree which illustrates the hierarchy.

The developer utilizes the code already written for the desired function within the class library by selecting one of the classes for inclusion in the application under development. A copy or "instance" of the class is included in the application being created. The instance includes not only the selected class but all necessary classes from the class' parent classes within the hierarchy to make the instance functional during execution of the application. However, the developer may need to know certain things about each class; this is especially the case if developer wants to modify any of the characteristics/code associated with the class. Both before and after including a class in an application, the developer may need to know the function that will be provided by the class, parent classes and subclasses of a particular class, and needs to be able to view and modify (after inclusion) the appropriate code or methods which provide certain functions or characteristics.

Figure 3A:
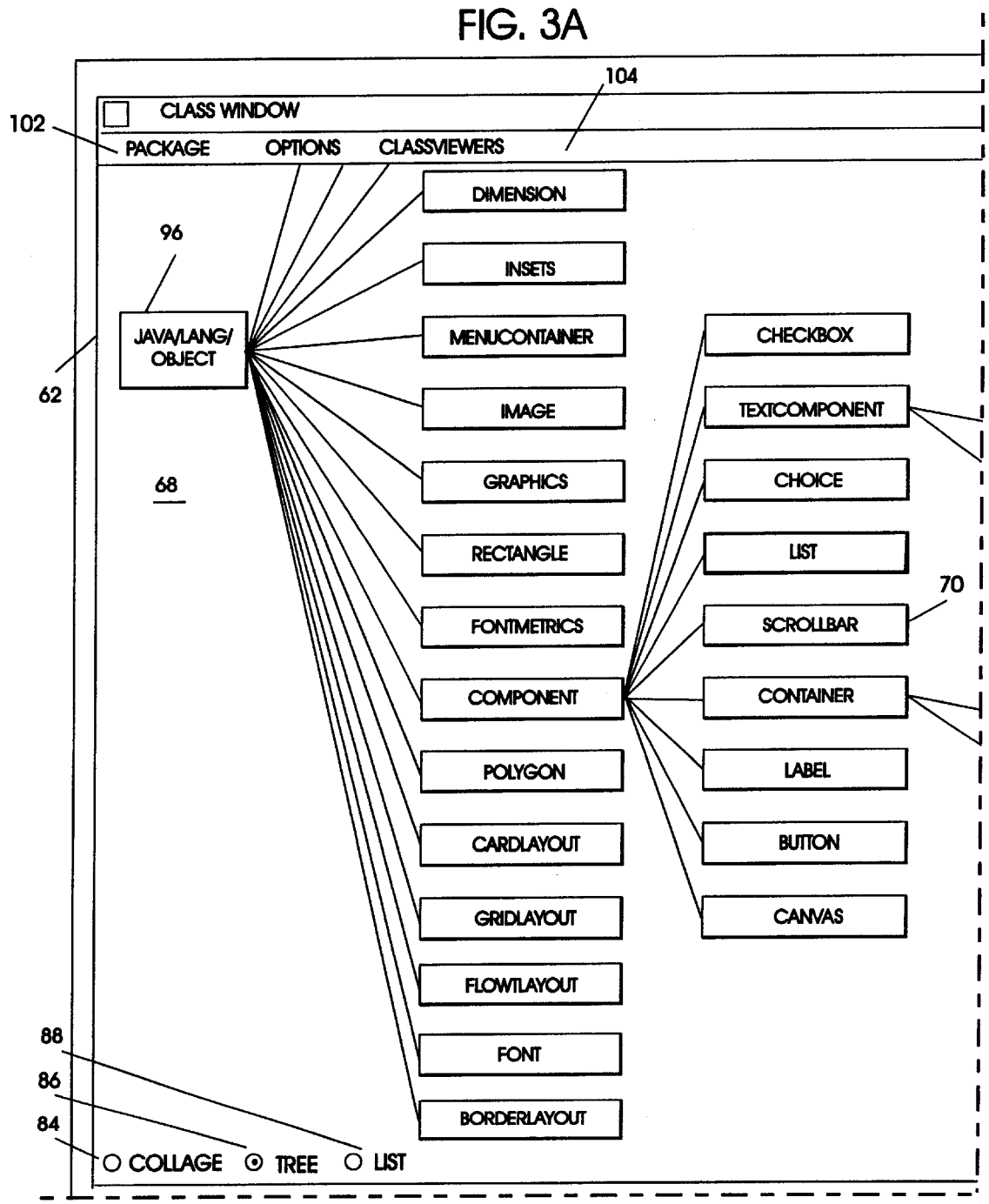
FIG. 3 illustrates a graphical user interface for computer software implementing the present invention.
Figure 3C:
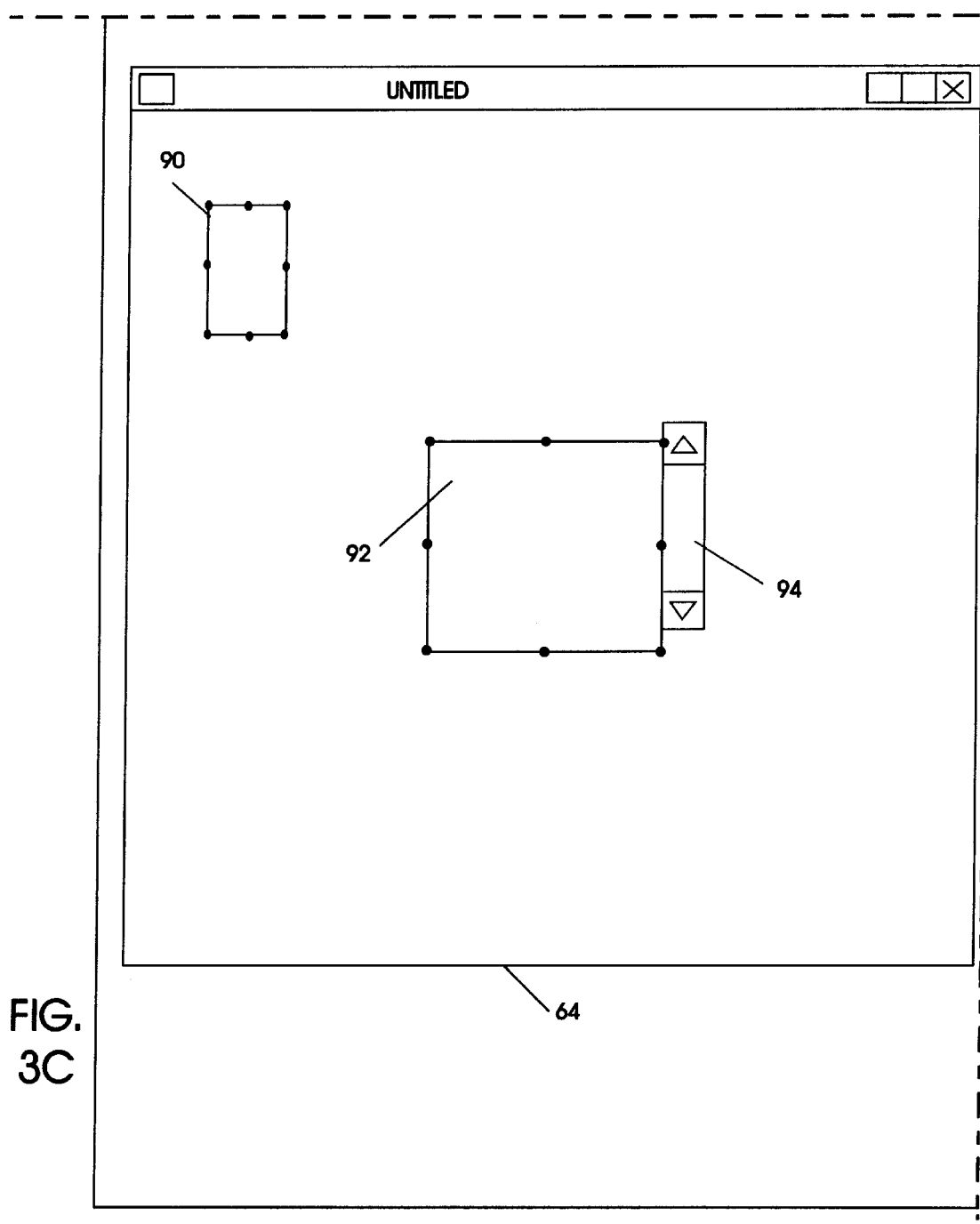
Figure 3D:
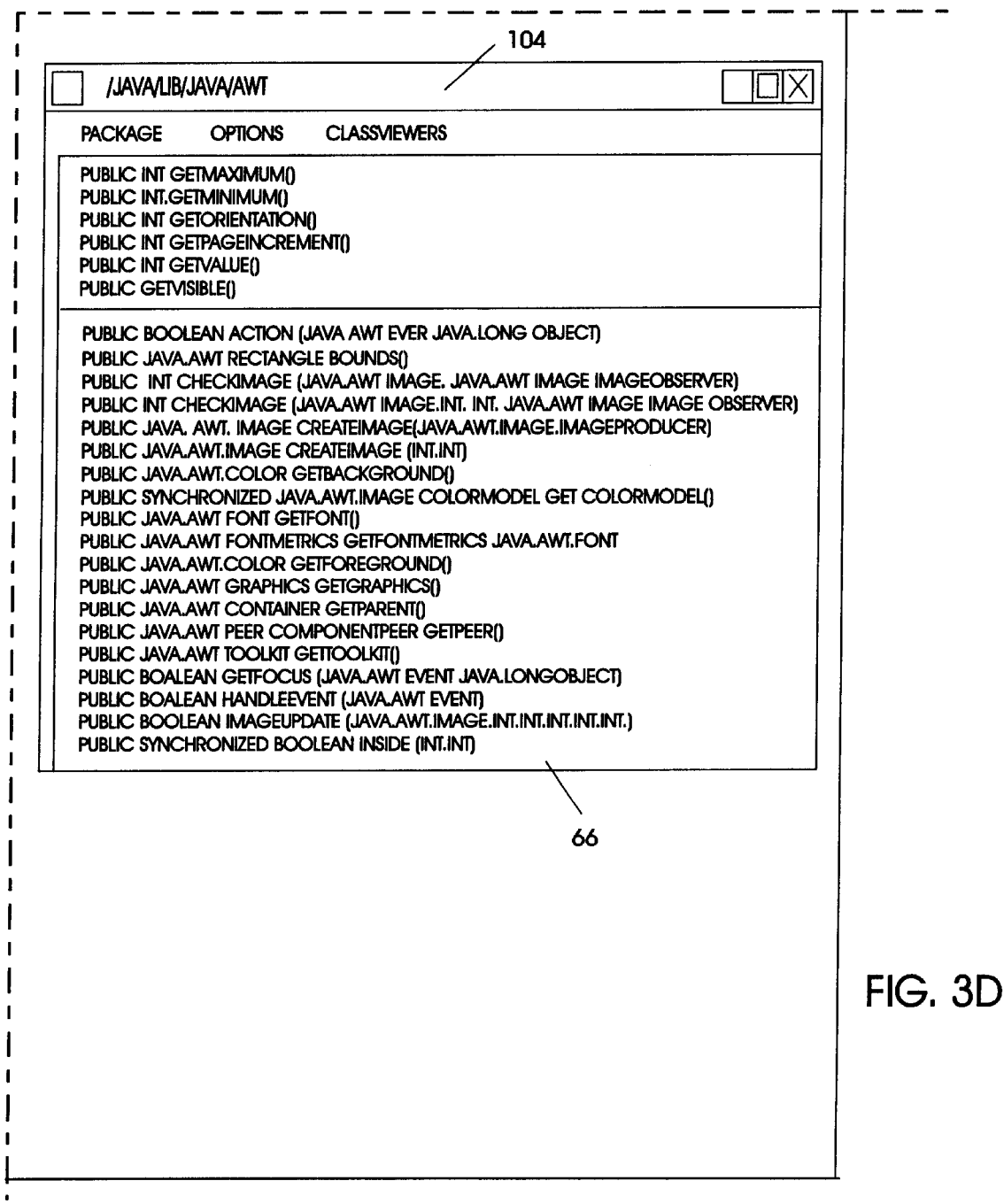
Figure 5:
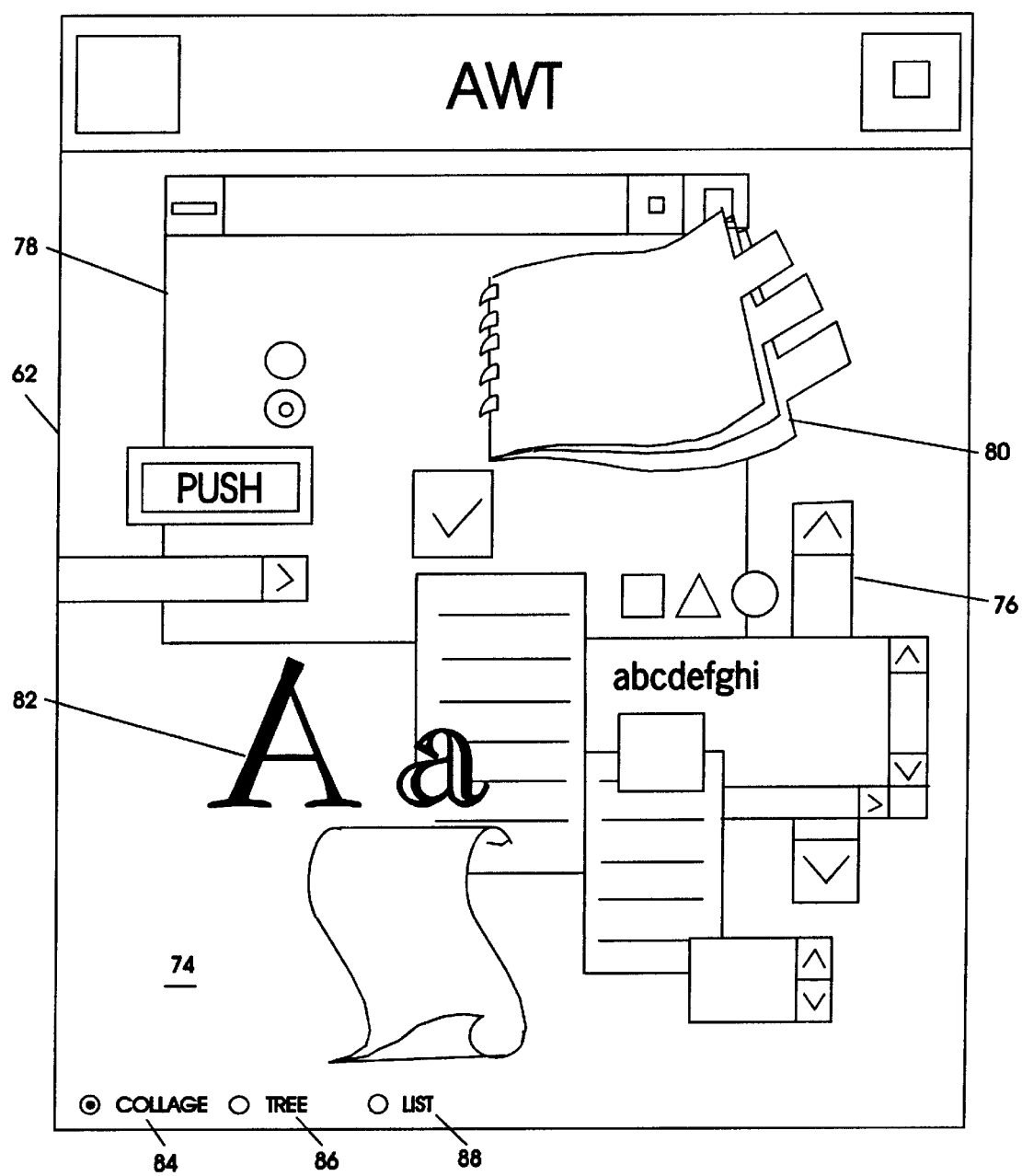
FIG. 5 illustrates a selectable collage window in accordance with the present invention.

FIG. 3 illustrates a graphical user interface for an application development tool which utilizes the present invention. The GUI 60 includes a class window 62, a composition editor window 64, and a methods window 66. In the preferred embodiment, the class window 62 displays selectable representations of the available classes in three different modes. In FIG. 3, the class window 62 illustrates a class tree 68 for a particular class package, with a scroll bar class box 70 highlighted, indicative of selection by the user. Alternatively, the class window 62 can be used to list the classes available for selection by a developer for an application being developed, as illustrated by the class list 72 in the class window 62. In a third mode, the class window 62 can be employed to show the selectable classes graphically, such as in a collage 74, as illustrated in FIG. 5. In the collage 74, classes are illustrated by renderings of how the classes might graphically appear in an application. Of course, this format is most useful for classes which represent graphical features/functions. The graphical illustration for each selectable class has a selectable hot spot which corresponds to the location of its displayed representation in the class window 62 to the developer. Selection of the representation via a mouse or other selection technique selects the corresponding class. For example, a developer may add a scroll bar to an application being created by clicking on a scroll bar representation 76 in the collage 74; a window by clicking on a window representation 78; an attributes notebook by selecting an attributes notebook representation 80; a type font/language by selecting a type font/language representation 82; etc.

It is known in the art how to display the class tree for a class, and how to cause selection of an item or hot spot to cause a subsequent action. Thus, specifics for implementing these concepts will not be discussed. The skills required to illustrate a set of classes in a class tree, or in a list, or in a collage are known to those skilled in the art, and will not be further discussed herein.

Figure 4:
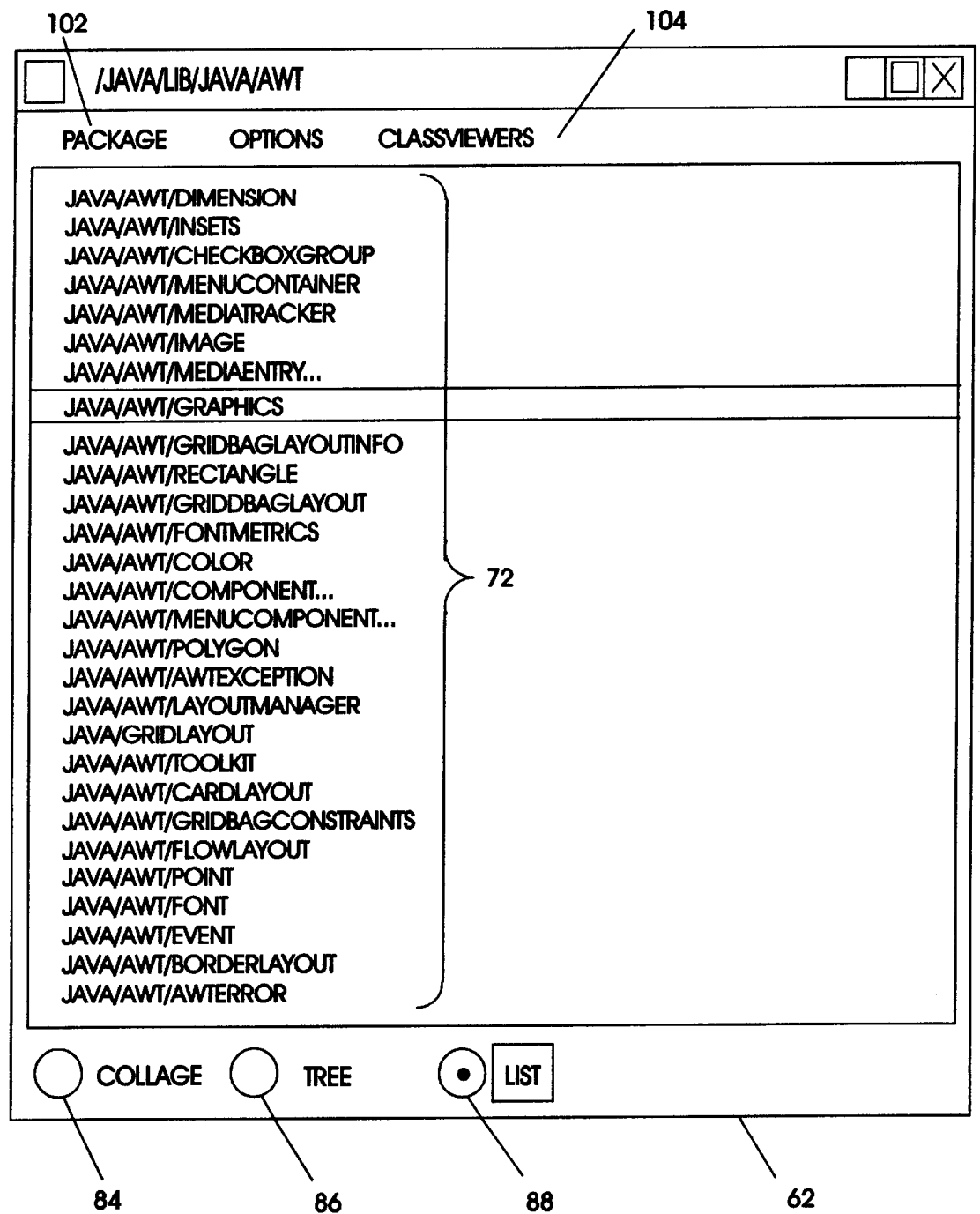
FIG. 4 illustrates a class list window in accordance with the present invention.

A user may manipulate the class window 62 to effectively toggle between the view of the collage 74, the view of the class tree 68, and the view of the class list 72 by selecting a collage button 84, class tree button 86, and class list button 88, respectively, which are displayed in the lower left hand corner of the class window 62 in FIGS. 3 through 5.

After the developer has selected one of the classes from the class window 62, the methods window 66 displays the methods (code) for the selected class. Through the methods window 66, a developer may modify the methods for the selected class or write new methods to extend the functionality of the class. For example, the scroll bar class box 70 is highlighted in the class window 62 of FIG. 3, showing that it has been selected. Correspondingly, the methods for the scroll bar class are displayed in the methods window 66.

The composition editor window 64 illustrates a graphical representation, if any, of the application being created by the developer. The classes illustrated in the class window 62 may or may not have visual structures corresponding to them. According to the preferred embodiment, a developer uses a mouse to select a class from the class tree 68 displayed in the class window 62. By dragging the selected class with the mouse to the composition editor window 64, the developer adds the selected class to the application being created. If the added/selected class has a visual representation, the visual representation is displayed in the composition editor window 64. The visual representation can be dragged to its desired location within the composition editor window 64. Through known techniques, the underlying application development tool, either with or without direction from the developer, connects the class to the already constructed portion of the application being created. The composition editor window 64 of FIG. 3 displays a graphical user interface which is partially completed. A button 90, text area 92 and scroll bar 94 have been added to the application being created by the developer and placed in their desired positions in what will be a screen of a graphical user interface that will be displayed to a user of the application being created after it is finished and distributed. The graphical elements 90, 92, 94 may have been added to the composition editor window 64 from any of the class tree 68, the class list 72, or the collage 74. If a class, as dragged from the class tree 68, class list 72 or collage 74 of the class window 62 and added to the application, is not exactly what the developer wants for use in the application being created, the developer can use the methods window 66 to access the methods (code) associated with the instance of the selected/added class to modify the selected/added class instance as desired. For example, the developer could change the color, modify the size, change the shape, etc.

In the preferred embodiment, the class displayed in a given class tree 68 belong to a single class package. If the class tree 68 for a selected class package is too large to fit within the class window 62, horizontal and vertical scroll bars may be added to the class window 62 so that the developer can manipulate the class window 62 to view the entire class tree 68. Alternatively, the structure of the class tree 68 may itself be movable and manipulable via a mouse so that the tree 68 can be moved so that different portions are visible within the class window 62, the lengths of the branches are made longer or shorter, the spacing between the boxes can be modified, etc. Additionally, the class tree 68 for a selected class package will not necessarily be a single tree structure. For example, the class tree 68 includes separate class tree structures for a JAVA/Lang/Object superclass 96, a JAVA/Lang/Exception superclass 98, and a JAVA/Lang/Error superclass 100. The programmer who originally created a particular class package combines in that package the hierarchies which the programmer feels will be most useful to a developer. A developer selects a class package for display by selecting from a list of available class packages. Preferably, a "Package" option 102 is available to developers in a menu bar 104 included in the class window 62. When the developer selects the Package option 102, a list of available class packages is displayed in a pull down menu. The developer selects a class package for display within the class window 62 by selecting one of the listed class packages.

Figure 6B:
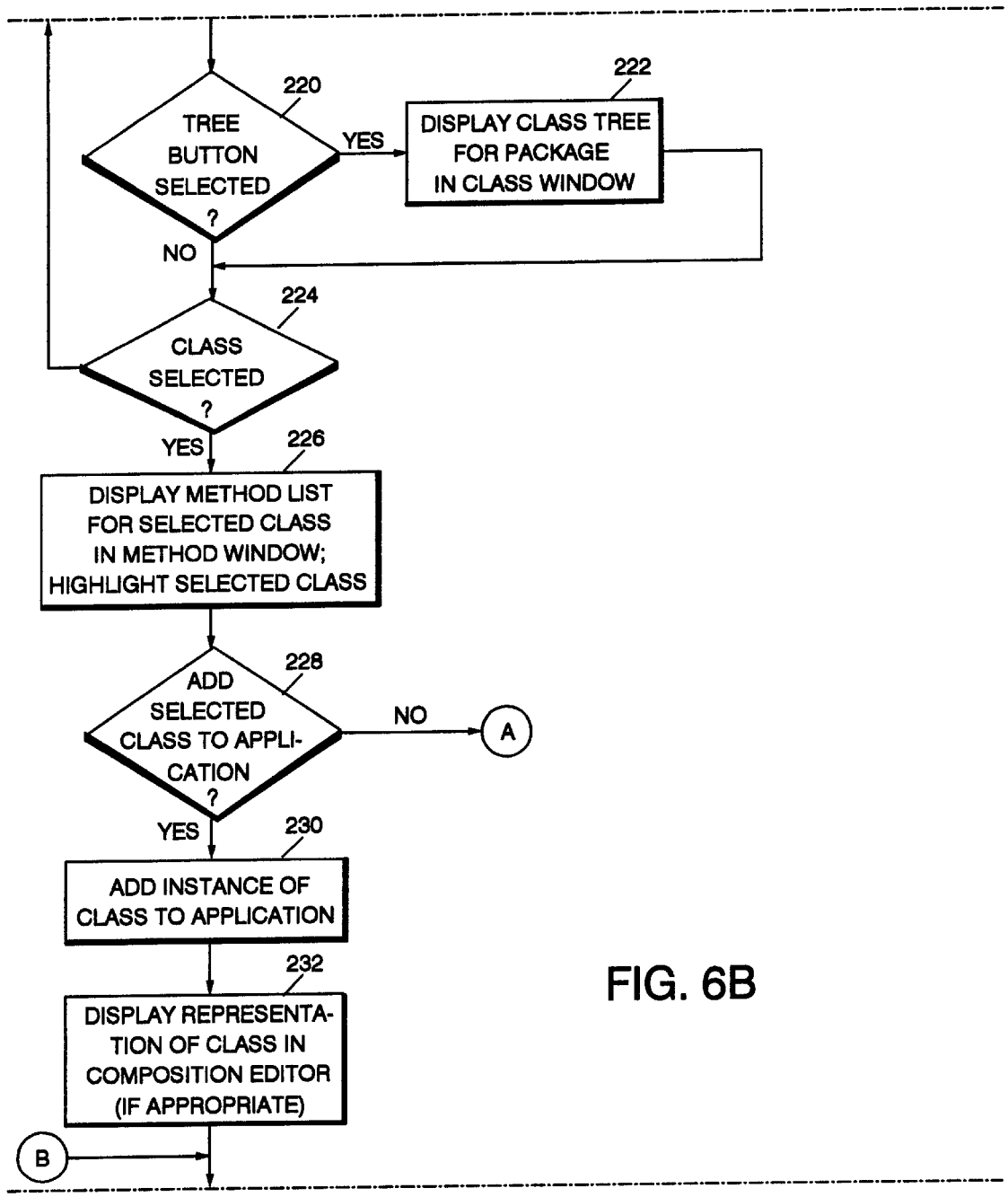
Figure 6C:
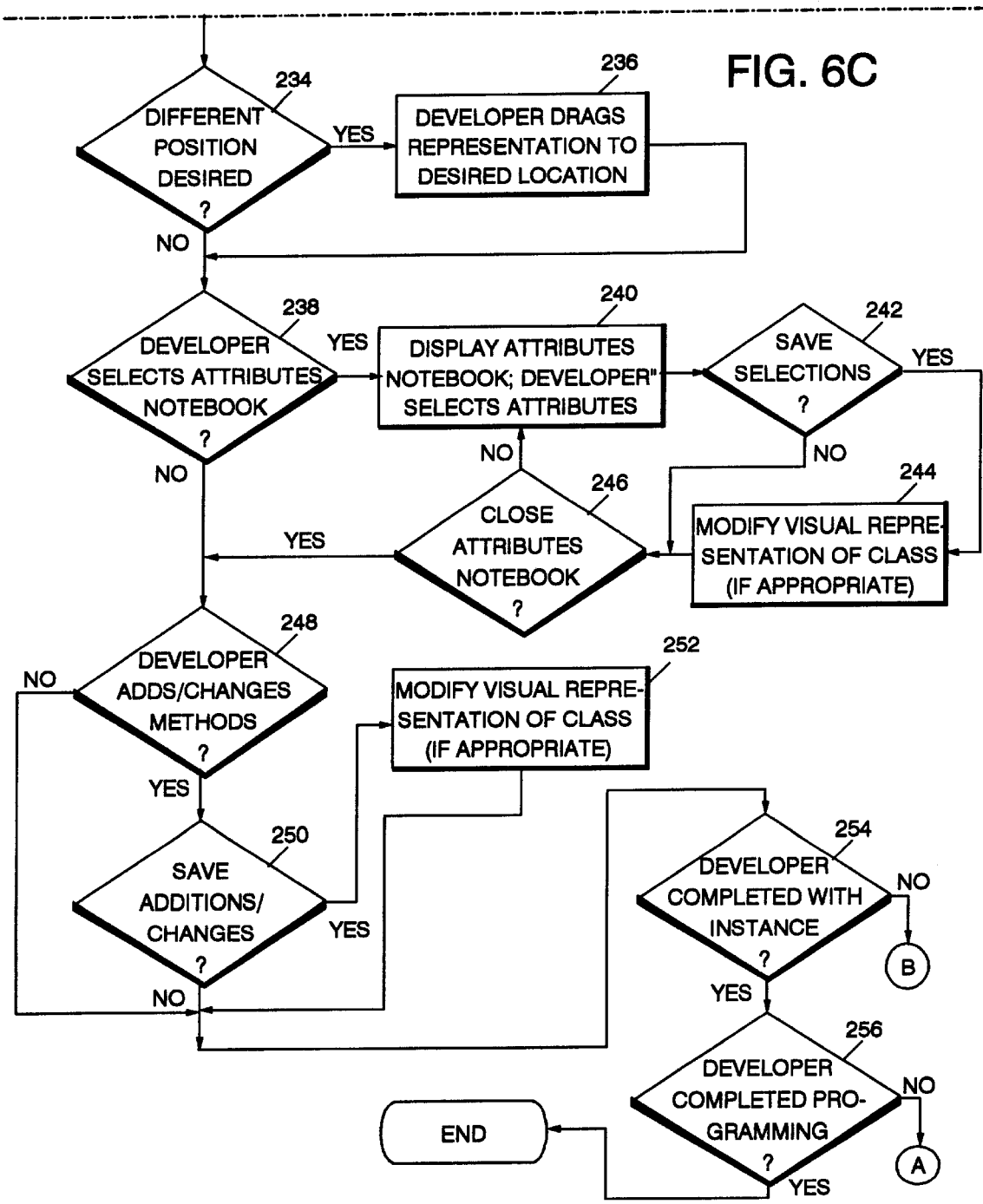

The present invention will now be described in detail with reference to the flowchart of FIG. 6. The preferred embodiment of the present invention is written in the Java object oriented programming language. Although it could be written in other languages and practiced in those languages, the description below will be that of an application development tool for developing Java applications. Java has certain qualities and characteristics which are exploited by the present invention. One such characteristic is that Java class libraries are relatively independent in nature and their hierarchies are not interrelated with great complexity, as opposed to the class libraries for some other object oriented languages. This enables a developer to view large portions or all of a selected class library related to a particular function or set of functions with relative ease within the class window 62. Additionally, Java has been designed with the Internet in mind, and thus easily supports distributed processing and computing. Thus, the present invention can easily be practiced while actively connected to a network. This can reduce local memory requirements in the developer's own workstation, since the development tool can quickly and easily access a desired class library resident on a different workstation or processor or server by simply knowing the uniform resource locator (URL) at which the desired class library can be found.

An example of programming utilizing the present invention will now be described with respect to FIGS. 3 and 6. As with any application development tool or development environment, a number of classes or class libraries will be available to the developer for inclusion in an application the developer is developing. As used below, the term "class package" is utilized to describe a class library, a class, a part, a component, or a set of classes that are presented together for selection by a developer for inclusion in the application being created. According to the present invention, when the application builder portion of an application development tool is opened, the GUI 60 of FIG. 3 is displayed including the class tree for a default class or class package within the class window 62 of the GUI 60 (Step 200). The developer may select a different class or class package for browsing by selecting the Package option 102 from the menu bar 104 and the selecting the desired package from a pop-up menu by using a mouse or other appropriate selection means (Step 202). The program then determines whether the selected class package is local (resides in memory which is directly accessible by the local processor running the program) or is remote and needs to be retrieved over a network, such as the Internet (Step 204). If the class package is local, then the class package is retrieved from memory and the class tree for selected class package is displayed in the class window 62 (Step 206). If the class package is not local, information maintained locally with the listing of the class package, such as URL, is employed to automatically find the class package from the Internet (Step 208). The class package may then be stored locally and the class tree for the class package is displayed within the class window 62 of the GUI 60 (Step 210).

The developer may then choose to alter how the class package is displayed within the class window 62. For example, when the developer selects the collage button 84 (Step 212), the application development tool will display the collage (if any) for the selected class package in the class window 62 (Step 214). When the developer selects the class list button 88 (Step 216), the application development tool will display the class list for the selected class package in the class window 62 (Step 218). Subsequent selection of the collage button 84, tree button 86, or class list button 88 causes the collage, class tree, or class list, respectively, corresponding to the selected class package to be displayed in the in class window 62.

When a developer selects a class by selecting the class from the class list 72 or a visual representation of the class from the collage 74 or the box representing the class form the class tree 68 (Step 224), the class from the class list 72, the visual representation from the collage 74 or the class box from the class tree 68 is highlighted or otherwise visually distinguished from the other listed classes, visual representations, or boxes, and the methods for the selected class are displayed in the methods window 66 (Step 226). This enables the developer to understand the hierarchy for a selected class (via the class tree 68), view the visual representation (if any) for the selected class (via the collage 74) and browse the methods for the selected class (via the methods window 66) from the single graphical user interface screen 60.

The developer may then (in Step 228) add the selected class to the application being created or return to Step 202 to change the class package being displayed (Steps 202–210), and/or change the way the class package is presented in the class window 62 (Steps 212–222) and/or select a different class (Step 224). When the developer decides to add the selected class to the application in Step 228, such as by dragging and dropping the selected class from the class window 62 to the composition editor window 64, an instance of the class is added to the application (Step 230).

All, some or none of the classes available for selection from window 62 the class will have a graphical image associated therewith to be displayed to an end user of the application. If the added class has such a graphical image, the image is displayed within the composition editor window 64. For a class that does not create a graphical element, an indicator of the class may be added to the composition editor window 64 (Step 232). Once the instance has been added, if the class has a graphical representation, such as the class for the text area 92 or the scroll bar 94, the developer may position or change the position of the graphical representation in the application's interface screen as displayed during construction in the composition editor window 64, if desired (Step 234), by dragging the graphical representation to its desired location within the composition editor window 64 (Step 236). The technique for including and changing the position for a graphical representation of a class in a GUI for an application under development is known in the art, and will not further described.

In application development tools, it is common that options are built into class libraries or parts or components that are available for inclusion in applications. So, in addition to a default setting, a class may be enabled to provide a developer with options for customizing its settings. Additionally or alternatively, the class may include a dialog for obtaining from the developer required information for associating the instance with other portions of the application being created, external databases, etc. In some tools, the options are presented to the developer for browsing and selecting in an attributes or settings notebook. Accordingly, in the present invention, for classes which are enabled with an attributes notebook, the developer (in Step 238) may select to open the attributes notebook for the selected/added class. If so, the attributes notebook is displayed in accordance with known techniques in the composition editor window 64, and the developer utilizes the attributes notebook to customize and/or connect the instance (Step 240). If the developer decides to save the selections made via the attributes notebook (Step 242), the visual representation of the instance is modified to reflect the selections, if any visual elements of the class' graphical representation have been changed (Step 244). At any time, the developer may choose to close the attributes notebook (Step 246).

The developer also has the option to modify/extend the function or features of the instance by modifying the existing methods or adding new methods. The methods for the instance of the selected/added class are displayed within the methods window 66. If the developer modifies the existing code or writes new code for instance via the methods window 66 (Step 248), the developer may then chose to save the new and/or modified methods in Step 250. If the saved changes or additions affect the visual representation (if any) in the composition editor window 64 of the instance, the visual representation is modified in accordance with the changes and/or additions (Step 252).

The developer may repeat the processes described with respect to Steps 234–252 until the instance of the selected/added class is in a condition desired by the developer. When the developer indicates to the tool that he has completed development with respect to the instance in Step 254, by selecting an appropriate choice offered by the tool, the developer has the option in Step 256 to stop development relative to the application being created or return to Step 202. If the developer chooses to return to Step 202, the developer may select a new class package with which to work or may select another class from the class package from which the selected/added class was selected.

Even though the developer may have indicated her decision to stop development relative to the instance in Step 254, the tool with which the present invention is implemented preferably permits the developer to reopen the instance at a later time and continue modifying or extending the function of the instance of the selected/added class. Similarly, even after the developer has chosen to stop development altogether and close the application tool development in Step 256, the developer may reopen the application development tool at a later time to continue development of the application being created.

While the present invention has been described in terms of an object oriented tool for creating Java applications, the basic techniques described herein are applicable to many types of development tools for different languages. Thus, while the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. Computer readable code on media for use in a computing environment for permitting development of an application from a plurality of available classes, comprising:

first subprocesses for displaying a hierarchy of selectable classes in a class tree, the selectable classes being selectable for inclusion in the application under development from the class tree;

second subprocesses for simultaneously displaying a graphical representation of the application under development; and third subprocesses for simultaneously displaying code for one of the selectable classes.

2. Computer readable code according to claim 1, further comprising fourth subprocesses for displaying the selectable classes in a class list.

3. Computer readable code according to claim 1, further comprising fifth subprocesses for displaying the selectable classes as selectable graphical representations, wherein selection of one of the graphical representations selects its corresponding selectable class for inclusion in the application under development.

4. Computer readable code according to claim 2, further comprising sixth subprocesses for displaying one of the class trees and the class list at a time in a class window.

5. Computer readable code according to claim 1, wherein the class tree is displayed in a class window, the graphical representation of the application under development is displayed in a composition editor window, and the code is displayed in a code window, and wherein the class window, the composition editor window and the code window are displayed simultaneously.

6. Computer readable code according to claim 5, further comprising seventh subprocesses for permitting a user to select for display in the class window from among the class tree, a class list of the selectable classes, and selectable graphical illustrations of the selectable classes.

7. In an application development tool in a computing environment a method for presenting class packages to a developer having classes for selection by the developer and inclusion in an application being created, comprising the steps of:

displaying a class package in a first window, wherein classes from the displayed class package are selectable for inclusion in the application being created, and the classes in the displayed class package are displayed hierarchically in a class tree, from which the classes are selectable:

displaying a graphical representation of the application being created in a second window; and displaying code for a class from the displayed class package in a third window.

8. A method for presenting class packages according to claim 7, wherein the first, second and third windows are displayed simultaneously.

9. A method for presenting class packages according to claim 7, said method further comprising the step of permitting a user to select which class package is to be displayed in the first window from a plurality of class packages.

10. A method for presenting class packages according to claim 7, said method further comprising the step of permitting a user to select to have classes comprising the class package displayed hierarchically in class tree format or in a collage of graphical representations of the classes.

11. A method for presenting class packages according to claim 10, wherein said permitting step also permits the user to select to have the classes comprising the class package to be displayed in a class list.

12. A method for presenting class packages according to claim 7, wherein said displaying code step further comprises, upon a user selecting a class, displaying the code for the selected class in the third window.

13. A method for presenting class packages according to claim 7, wherein a user may modify the code for the class in the third window.

* * * * *